United States Patent [19]
Keller

[11] Patent Number: 5,939,508
[45] Date of Patent: Aug. 17, 1999

[54] HIGH TEMPERATURE EPOXY-PHTHALONITRILE BLENDS

[75] Inventor: Teddy M. Keller, Alexandria, Va.

[73] Assignee: The United States of America as represented by the Secretary of the Navy, Washington, D.C.

[21] Appl. No.: 08/828,630

[22] Filed: Mar. 31, 1997

Related U.S. Application Data

[63] Continuation of application No. 08/523,528, Sep. 1, 1995, abandoned.

[51] Int. Cl.$^6$ .......................... C08G 59/00; C08G 65/08; C08G 65/14; C08G 63/44
[52] U.S. Cl. ........................ 528/96; 528/99; 528/362; 525/481; 525/482; 525/504; 525/534
[58] Field of Search ................. 528/96, 99, 362; 525/481, 482, 504, 534

[56] References Cited

U.S. PATENT DOCUMENTS

| | | | |
|---|---|---|---|
| 4,408,035 | 10/1983 | Keller | 528/123 |
| 4,409,382 | 10/1983 | Keller | 528/173 |
| 4,410,676 | 10/1983 | Keller | 528/9 |
| 4,448,940 | 5/1984 | Koyama et al. | 525/504 |
| 4,619,986 | 10/1986 | Keller | 528/99 |
| 4,981,941 | 1/1991 | Griffith | 528/93 |
| 5,262,514 | 11/1993 | Keller | 528/322 |

OTHER PUBLICATIONS

Makhija et al., *Polymer News*, 1992, vol. 17, pp. 165–169.
Brady, Jr., *J. Protective Coatings & Linings*, Nov. 1985, pp. 24 through 31.
Tactix®, *Performance Polymers for Advanced Composites and Adhesives*–Resins and Hardeners for Aerospace Applications, Product Data Sheet from Dow Chemical (date unavailable), pp. 1 through 18.
Ciba–Geigy, Product Data Sheet for Araldite ®MY 720 (date unavailable).
Interez, Inc., Product Data Sheets for RDX 80351 Cyanate Exter Resin Solution (date unavailable).
Dow Chemical, Product Data Sheets for High–Temperature, High Performance Epoxy Resins, D.E.N.® 431, D.E.N.® 438, D.E.N.® 439 (date unavailable).
Shell Resins, Product Data Sheets for Epon Resin 828 (date unavailable ).
Lee et al., *Epoxy Resins*–Their Applications and Technology, McGraw–Hill Book Co., Inc., New York, p. 17 (1957).
Lee et al., *Handbook of Epolxy Resins*, McGraw–Hill Book Co., Inc., New York, Chapter 2, pp. 2–1 through 2–32 (1967).
Jang, Bor Z., *Advanced Polymer Composites*, ASM International, Materials Park, Ohio, p. 22 (1994).

*Primary Examiner*—Frederick Krass
*Attorney, Agent, or Firm*—Thomas E. McDonnell; Barry A. Edelberg

[57] ABSTRACT

A copolymer is formed from reacting, within a melt, a phthalonitrile resin with an epoxy resin having at least three epoxy groups. In an alternative embodiment, a copolymer is formed by reacting a phthalonitrile resin with an epoxy resin, at least one of the epoxy and phthalonitrile resins having a perfluorinated carbon. The copolymers of the present invention have exceptional thermal stability and a low affinity for water.

31 Claims, 1 Drawing Sheet

HIGH TEMPERATURE EPOXY-PHTHALONITRILE BLENDS

The present application is a continuation application of U.S. Ser. No. 08/523,528, Sep. 1, 1995, now abandoned.

BACKGROUND OF THE INVENTION

1. Field of the Invention

The present invention relates generally to high temperature polymers, and more specifically to high temperature polymer blends including a phthalonitrile resin.

2. Description of the Background Art

In U.S. Pat. No. 4,619,986, issued Oct. 28, 1986, to Teddy M. Keller, the entirety of which is incorporated herein by reference for all purposes, phthalonitrile resins having the formula:

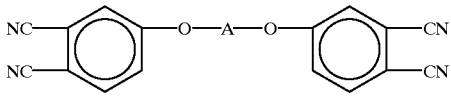

are blended with epoxy monomers having the formula:

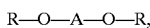

R—O—A—O—R, where A is selected from the group consisting of —$\phi$—$C_nH_{2n}$—$\phi$—, —$\phi$—$SO_2$—$\phi$—, —$\phi$—, —$C_nH_{2n}$— and —$\phi$—$\phi$— wherein n ranges from 1–4, the phenyl groups are linked at the para or meta positions, and R is selected from the group consisting of linear epoxies having 3–5 carbon atoms. When polymerized, the blend forms a polymer of greatly improved thermo-oxidative stability relative to the amine-cured epoxy. However, the thermal stability of the polymerized blend is less than that of the amine-cured phthalonitrile polymer.

SUMMARY OF THE INVENTION

Accordingly, it is an object of this invention to provide a polymer having a high thermal stability.

Another object of the present invention is to provide a polymer with a low affinity for water, and a low cure temperature compared to the cure temperature of bisphenol-linked phthalonitrile.

Another object of the present invention is to provide a phthalonitrile polymer blend having an improved thermo-oxidative stability compared to that of the amine-cured epoxy polymer and at least essentially equivalent thermal stability compared to that of the corresponding phthalonitrile polymer.

These and additional objects of the invention are accomplished by a polymer formed by copolymerizing a phthalonitrile resin with an epoxy resin having at least three epoxy groups. In another embodiment, the present invention is a copolymer formed by the polymerization of a bisphthalonitrile with a bisphenol epoxy resin, at least one of which has a perfluorinated alkylene bridging group.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

Figure 1:
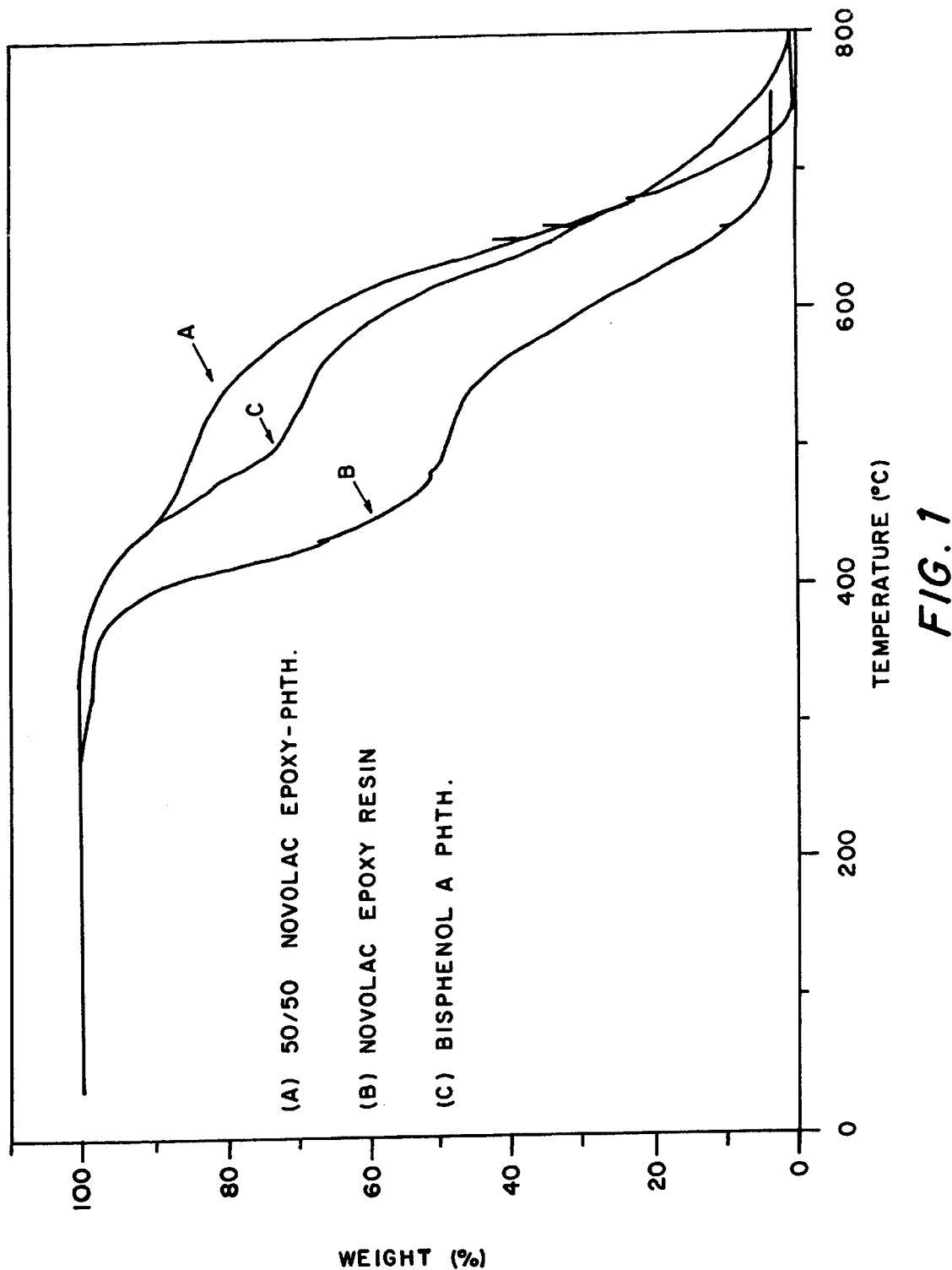
FIG. 1 is a comparison of the thermogravimetric analysis (TGA) thermograms for a copolymer formed from a 50/50 molar mixture of epoxy novolac (D.E.N. 431) resin and 2,2-bis[4-(3,4-dicyanophenoxy)phenyl]propane (line A), epoxy novolac (D.E.N. 431) resin (line B), and 2,2-bis[4-(3,4-dicyanophenoxy)phenyl]propane (line C).

In a typical embodiment, the present invention is obtained by the copolymerization of a phthalonitrile resin having the formula:

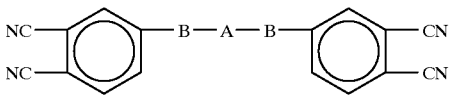

where A is any at least divalent group having at least one aromatic or heterocyclic moiety and is typically selected from the group consisting of:

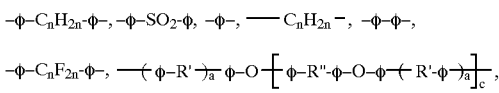

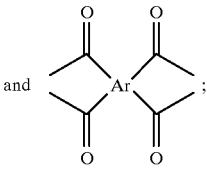

Ar is any aromatic or heterocyclic moiety;
B is oxygen, sulfur or nitrogen, and is nitrogen when A is:

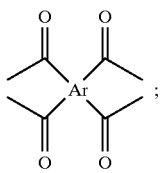

R' is:

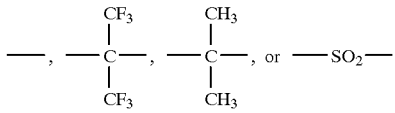

and may be the same or different at each position within A;
R" is:

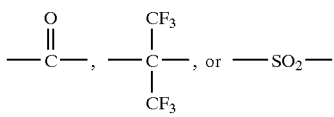

and may be the same or different at each position within A;
a is 0 or 1;
c is equal to or greater than 1; and
n is equal to or greater than 1;

with an epoxy resin of the formula:

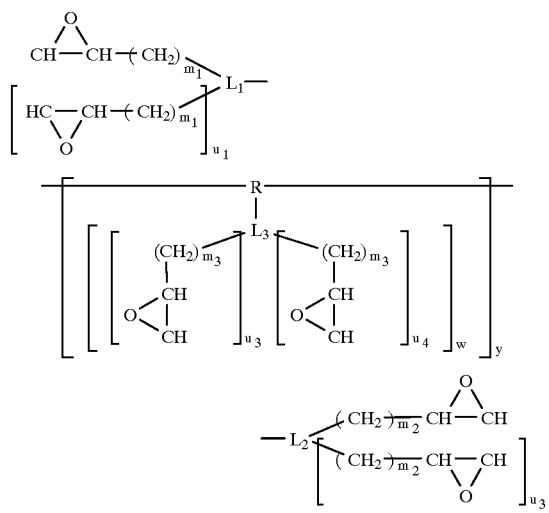

where:

$L_1$ is $CH_2$, oxygen, or sulfur when $u_1=0$ and is nitrogen when $u_1=1$;

$L_2$ is $CH_2$, oxygen, or sulfur when $u_2=0$ and is nitrogen when $u_2=1$;

$L_3$ is $CH_2$, oxygen, or sulfur when $u_4=0$ and is nitrogen when $u_4=1$;

$m_3$ is an integer having a value of from 1 to 3, inclusive, when $L_3$ is other than $CH_2$, and is 0 to 3 when $L_3$ is $CH_2$;

$m_1$ is an integer having a value of from 1 to 3, inclusive when $L_1$ is other than $CH_2$ and is 0 to 3 when $L_1$ is $CH_2$;

$m_2$ is an integer having a value of from 1 to 3, inclusive when $L_2$ is other than $CH_2$ and is 0 to 3 when $L_2$ is $CH_2$;

$u_1$ is 0 or 1;

$u_2$ is 0 or 1;

$u_3$ is 0 when w is 0 and is 1 when w is at least 1;

$u_4$ is 0 when w is 0 and is 0 or 3 when w is at least 1;

w is an integer and is typically 0 or 1;

at least one of $u_1$, $u_2$, and $u_3$ is equal to 1;

y is at least one; and

R is any at least divalent organic radical having at least one aromatic or heterocyclic moiety.

$m_1$ and $m_2$ may be the same or different and are typically the same. $L_1$ and L may be the same or different and are typically the same. $L_3$, when present, may be the same as or different from any of $L_1$ and $L_1$ and is typically the same as $L_1$ and $L_2$. Usually, if $u_1$ equals 1, $u_2$ will also equal 1.

Where w has a value greater than one, then R is at least tetravalent and each

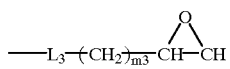

is attached to a different carbon along R.

Typically, R is selected from the group consisting of:

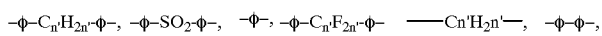

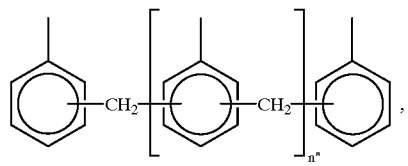

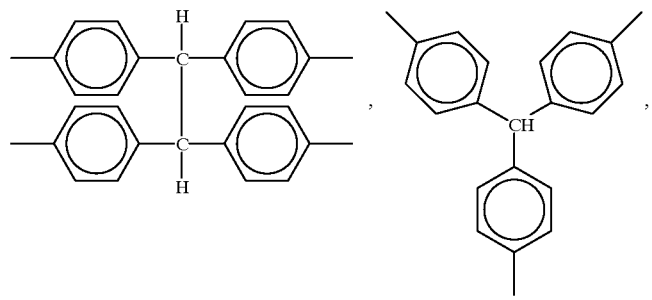

, and

-continued

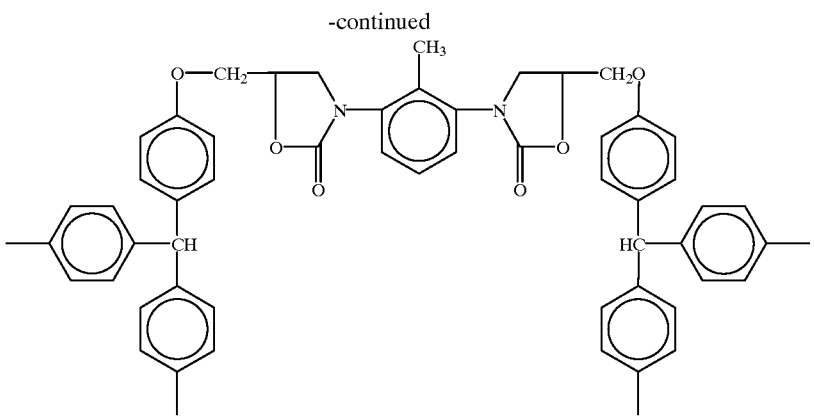

where n' is an integer equal to or greater than 1, and n" is an integer equal to or greater than 1.

Usually, y, n, n', and n" are sufficiently small that the epoxy resin and phthalonitrile are liquids at temperatures below about 270° C. Usually, the phthalonitrile resin and the epoxy resin will be miscible with each other at reaction temperatures, thus permitting intimate mixture and complete reaction. While the reaction between the epoxy and phthalonitrile resins may be performed at any temperature below the decomposition temperature of the least thermally stable resin, much of the advantage in the present invention arises from the low temperatures at which the resins react to form the desired copolymer. Thus, the epoxy and phthalonitrile resins are both typically liquids and miscible with each other, in the unreacted form, at reaction temperatures.

Typically, for above compounds having the "n'" or "no'"" subscript, the compound is available as a mixture of homologous oligomers, of the structure shown for that compound, in which the average value of n' or n", respectively, is from about 0.2 to about 3.0, and more often, about 0.2 to about 1.8.

Other examples of epoxy resins useful in the present invention include trifunctional fluorinated epoxy resins such as those described in U.S. Pat. No. 4,981,941 to Griffith, filed Mar. 27, 1989 and incorporated herein in its entirety by reference. For example, R in the above formula may be:

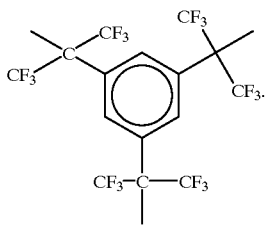

The polymerization reaction is accomplished by heating the melt of an epoxy-phthalonitrile mixture either neat, or in the presence of a curing agent, and curing at elevated temperatures (greater than about 150° C. and usually greater than about 200° C.). The rate of the reaction may be substantially enhanced by the addition of a curing additive. After a short time, which will be dependent on the presence, reactivity, nature, and quantity of curing agent, the melt starts to darken with a resulting viscosity increase. Quantities of 0 to 25 percent molar weight of amine to polymerization mixture are generally preferred. The preferred polymerization temperature is from about 5° C. above the melting point of the mixture to about 30° C. below the decomposition temperature of the polymer in the polymerization mixture having the lowest decomposition temperature, usually between about 150° C. to about 300° C. Polymerization can be performed in several steps over a series of temperatures.

The overall physical properties of the new polymer will depend on the relative amounts of epoxy, phthalonitrile, and curing agent (if any) used. Although equimolar amounts of the phthalonitrile and epoxy resins are most preferred, the physical properties of the resulting polymer can be varied by varying the ratio of phthalonitrile resins to epoxy resins. Even a trace amount of one resin will react with an excess amount of the other resin to give new characteristic properties to the resulting polymer. Mixtures of mole ratios of 20:1 epoxy/phthalonitrile and phthalonitrile/epoxy diminish the water uptake and enhance the $T_g$ values of the resulting polymer relative to epoxy polymers. Mole ratios of 5:1 epoxy/phthalonitrile and phthalonitrile/epoxy produce dramatic changes in the properties of the polymer as compared to those of the epoxy or phthalonitrile polymer alone. In all cases, the thermo-oxidative stability is enhanced with a resulting higher char yield relative to the epoxy cured with an amine or similar curing agent. Moreover, there is a reduction in the equilibrium water uptake of the epoxy phthalonitrile polymers relative to the epoxy polymer. There is an enhancement in the glass transition temperatures ($T_g$) relative to the epoxy polymer used whose value is again dependent on the relative amounts of each reactant, with higher ratios of phthalonitrile to epoxy favoring higher $T_g$'s. The major improvements of the new polymer relative to the phthalonitrile polymer is the processing or polymerization conditions. Lower temperatures are required for the polymerization reaction according to the present invention. This advantage is achieve with little or no significant loss of thermal stability relative to the amine-cured phthalonitrile polymer. In some cases, the epoxy-phthalonitrile copolymer of the present invention may even have improved thermal and oxidative stability over the amine-cured phthalonitrile. This improved stability probably indicates that the extent of polymerization reaction for the blend is higher relative to the amine cured phthalonitrile under similar processing conditions. Moreover, the epoxy-phthalonitrile blend can react without the addition of curing additives. Without a curing additive, pure phthalonitrile upon heat treatment at elevated temperatures is not readily converted to a polymer. Thus, unlike the present invention, pure phthalonitriles, in the absence of a curing agent, require several days of heating above 280° C. before the onset of gelation.

As stated above, the copolymers of the present invention, unlike the copolymers described in have U.S. Pat. No. 4,619,986 to Teddy M. Keller, have thermal and oxidative stabilities close to or better than that of the corresponding cured phthalonitrile. This improvement over U.S. Pat. No. 4,619,986 to Teddy M. Keller may be attributed to the present invention's use of epoxy resins having more than two reactive epoxy groups.

Epoxies and phthalonitriles appear to react via the mechanism shown below, using the reaction of one end of a typical phthalonitrile with one end of typical diepoxide as an example:

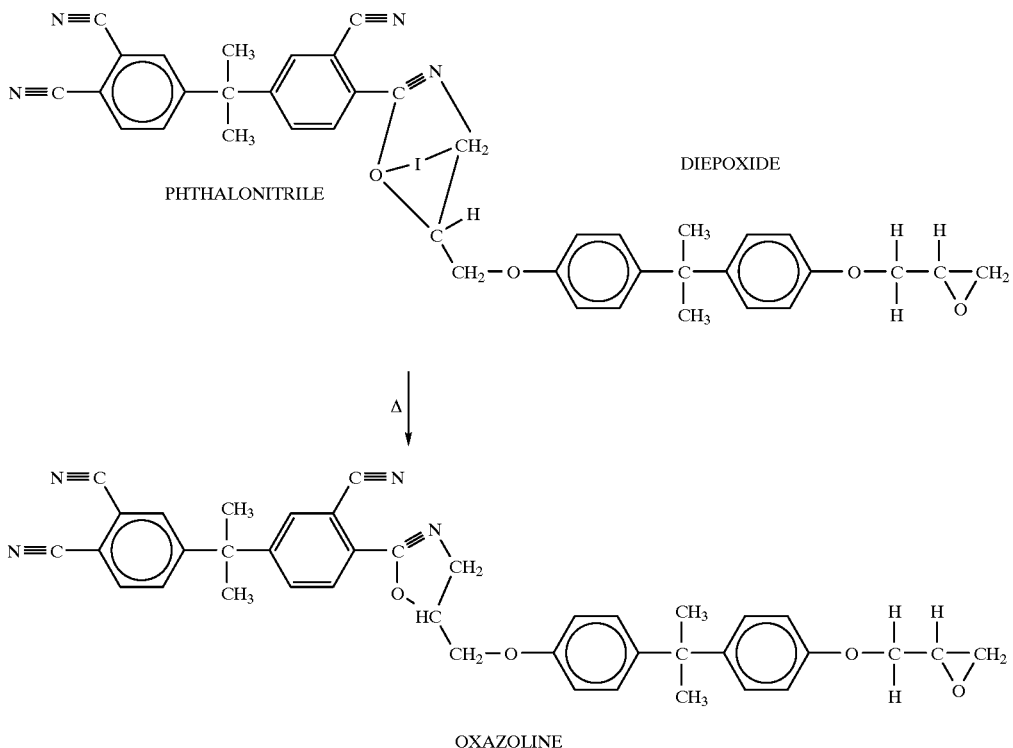

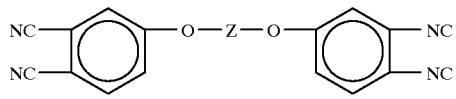

in which Z is —$C_nF_n$— or —$C(CF_3)_n$—. Some typical fluorinated difunctional epoxy components useful in making this embodiment of the invention are described in the aforementioned U.S. Pat. No. 4,981,941, to Griffith. Generally, useful fluorinated difunctional epoxy compo- The oxazoline ring formed by this reaction is a highly stable cross-linking center. As is apparent from the above example, a diepoxide can form only two cross linking centers per molecule of diepoxide. Higher epoxides, such as those used in the present invention, can form a greater number of cross-linking centers. Thus, a copolymer formed from a phthalonitriles and a higher epoxide (more than two epoxide groups) will obtain a greater cross-linking density and a higher stability than a copolymer formed from the same phthalonitrile and the same molar quantity of the analogous diepoxide.

In an alternative embodiment, the present invention is a copolymer of a bisphthalonitrile with a difunctional bisphenol epoxy, at least one of the components having at least one fluorinated carbon. For example, either or both components may have a perfluorinated alkylene bridging group. Typical useful fluorinated phthalonitrile components useful in making this embodiment of the invention include compounds of the formula:

nents useful in making the present invention include compounds of the formula:

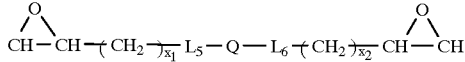

where:

$L_5$ and $L_6$ are —$CH_2$—, oxygen, or sulfur and may be the same or different; and $x_1$ is an integer having a value of from 1 to 3 when $L_5$ is oxygen or sulfur and has a value of from 0 to 3 when $L_5$ is —$CH_2$—;

$x_2$ is an integer having a value of from 1 to 3 when $L_6$ is oxygen or sulfur and has a value of from 0 to 3 when $L_6$ is —$CH_2$—;

Q is any at least divalent organic radical having at least one aromatic moiety and at least one perfluorinated carbon.

$x_1$ and $x_2$ may be the same or different.

Possible structures for Q are many too numerous to list and include, for example:

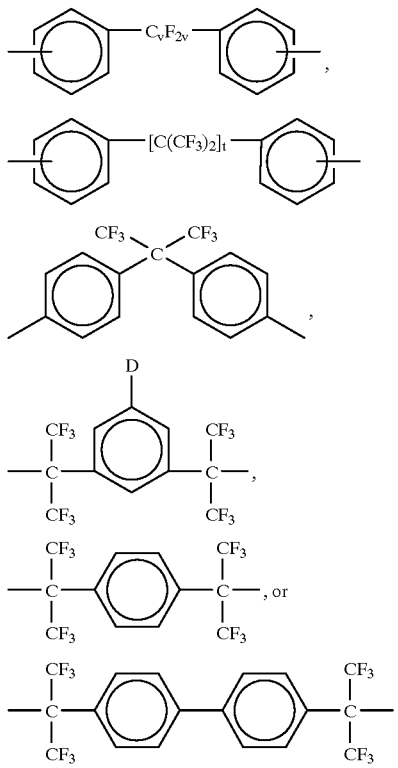

where:

v is an integer having a value of from 1 to 20, inclusive;

t is an integer having a value of from 1 to 4 and is typically 1 to 2 and is most often 1;

D is hydrogen or $(CF_2)_jCF_3$; and j is an integer having a value of from 0 through 15, inclusive.

The reaction between the phthalonitrile and epoxy components according to this embodiment is performed in essentially the same manner as described herein for the first disclosed embodiment.

Generally, for all embodiments, the more curing agent that is used, the quicker is polymerization. Unfortunately, the presence of large amounts of unreacted curing agent in the cured polymer can degrade properties. Typically, the weight percent of the curing agent relative to the resins is 0.1–40 weight percent, preferably 1–20 weight percent and more preferably about 5–10 weight percent.

As a more specific example, when the curing agent is an amine, the amount of curing agent employed is usually in about 0.1 to about 20 weight percent of the polymer mixture. Preferably, this amount is about 1 to about 15 weight percent. Most preferably this amount is about 5 to about 10 weight percent.

Any organic amine, phenol, strong organic acid, mineral acid, Lewis acid or salt of any of the above which polymerizes bisphthalonitrile monomers may be used as a curing agent in the present invention. A mixture of curing agents may also be employed.

Amine curing agents are useful in the present invention are described, for example, in the above-mentioned U.S. Pat. Nos. 5,003,078; 4,408,035; 5,159,054, all of which are incorporated herein by reference, for all purposes, in their entirety. Typically, the preferred amine curing agents are of the general formula $H_2NYNH_2$ where Y is an aromatic group. Amidines, especially diamidines, are particularly useful. Mixtures of amine curing agents may be used.

Specific examples of amine curing agents useful in this invention are given below:

o-phenylenediamine
m-phenylenediamine
p-phenylenediamine
4,4'-diaminodiphenylpropane
4,4'-diaminodiphenylmethane (commonly named 4,4'-methylenedianiline)
4,4'-diaminodiphenyl sulfide (commonly named 4,4'-thiodianiline)
4,4'-diaminodiphenyl ether (commonly named 4,4'-oxydianiline)
1,5-diaminonaphthalene
3,3'-dimethylbenzidine
3,3'-dimethoxybenzidine
2,4-bis(β-amino-t-butyl)toluene
bis(p-β-amino-t-butyl)ether
bis(p-β-methyl-o-aminopentyl)benzene
1,3-diamino-4-isopropylbenzene
1,2-bis(3-aminopropoxy)ethane
benzidine
m-xylylenediamine
p-xylylenediamine
2,4-diaminotoluene
2,6-diaminotoluene
1,3-bis(3-aminophenoxy)benzene
1,3-bis(4-aminophenoxy)benzene
1,4-bis(3-aminophenoxy)benzene
1,4-bis(4-aminophenoxy)benzene
bis[4-(3-aminophenoxy)phenyl]sulfone
bis[4-(4-aminophenoxy)phenyl]sulfone
4,4'-bis(3-aminophenoxy)biphenyl
4,4'-bis(4-aminophenoxy)biphenyl
2,2-bis[4-(3-aminophenoxy)phenyl]propane
2,2-bis[4-(4-aminophenoxy)phenyl]propane
4,4'-[1,4-phenylene(1-methylethylidene]bis(benzeneamine)
4,4'-[1,4-phenylene(1-methylethylidene]bis(2,6dimethylbenzeneamine)
hexakis (4-aminophenoxy)cyclotriphosphazene.

The curing of phthalonitriles with organic and inorganic acids, which also serve as useful curing agents in the present invention, is described, for example, in U.S. Ser. No. 07/818,575 now U.S. Pat. No. 5,237,045, filed Jan. 9, 1992, to Keller et al., entitled "CURING PHTHALONITRILE RESINS.", which is incorporated herein by reference in its entirety. Any strong organic acid, or mixture of organic acids, may be used as a curing agent in the present invention. Typically, a strong organic acid will exhibit a $pK_a$ in water of less than about 1.0. More preferably, a strong organic acid exhibits a $pK_a$ in water of less than about 0.80. Strong organic acids include, for example, aromatic acids containing inorganic acidic substituents, such as the sulfonic group —$SO_3H$. Specific examples of such aromatic acids include p-toluenesulfonic acid, phenylsulfonic acid, 1-naphthalenesulfonic acid, 2-naphthalenesulfonic acid, 1,5-naphthalenedisulfonic acid, 2,6-naphthalenedisulfonic acid, 2,7-naphthalenedisulfonic acid, phenylphosphonic acid, phenylphosphinic acid, and phenylboric acid.

While any strong inorganic acid may be used, typical strong inorganic acids useful in the present invention include mineral acids such as hydrochloric acid, phosphoric acid, sulfuric acid, sulfonic acid and nitric acid, and mixtures thereof. Nitric acid, a strong inorganic acid, may be used as a curing agent in the present invention, but is not preferred because of its high oxidation strength.

The curing agent may also be a salt of any of the amines, acids or phenols discussed above. Exemplary curing salts for use according to the present invention include bis(3-aminophenoxy)1,3-benzene p-toluene sulfonate, p-phenylenediamine p-toluenesulfonate, bis(4-aminophenyl)methane hydrochloride, and N-phenylbenzamidine p-toluene sulfonate.

Having described the invention, the following examples are given to illustrate specific applications of the invention including the best mode now known to perform the invention. These specific examples are not intended to limit the scope of the invention described in this application.

EXAMPLES

Example 1

Dow epoxy novolac (D.E.N. 431) resin (0.51 g. −1.45 mmol) and 4,4'-bis(3,4-dicyanophenyl)biphenyl (0.63 g, 1.45 mmol) were weighed into an aluminum planchet, melted and mixed at 240–250° C., and degassed at reduced pressure for 1 hour. A small sample was removed for thermal analysis studies. A sample (3.9 mg) of the mixture was placed in a DSC pan and scanned at 10° C./min to 300° C. The DSC thermogram exhibit a small endotherm at −50° C., a crystallization peak at −100° C., and an endotherm peaking at −220° C. attributed to the melting point of 4,4'-bis(3,4-dicyanophenyl)biphenyl. After the melting occurred, the sample commenced to exotherm indicating reaction of the 4,4'-bis(3,4-dicyanophenyl)biphenyl and novolac epoxy resin to afford the new high temperature polymer. Upon cooling and rescanning to 275° C., no characteristic $T_g$ was observed.

Example 2

Dow epoxy novolac (D.E.N. 431) resin (0.51 g. −1.45 mmol) and 4,4'-bis(3,4-dicyanophenyl)biphenyl (0.63 g, 1.45 mmol) were weighed into an aluminum planchet, melted and mixed at 240–250° C., and degassed at reduced pressure for 1 hour. To the degassed blend was added 1,3-(3-aminophenoxy)benzene (APB, 0.02 g) at 240–250° C. with stirring. After 30 seconds, a small sample was removed for DSC analysis. The remaining (main) sample started to increase in viscosity almost immediately. After 30 minutes, the main sample had solidified. The solidified sample was then heated at 260° C. for 3 hours to totally cure. A DSC thermogram was obtained on the uncured sample by scanning at 10° C./min from 25 to 275° C. under a flow of nitrogen at 50 cc/min. The sample exhibited an endotherm at −60° C., an exotherm peaking at −140° C., and an endotherm peaking at −220° C. attributed to the melting point of the 4,4'-bis(3,4-dicyanophenyl)biphenyl resin. As soon as the melting occurred, the sample immediately started to exotherm. Upon heating at 275° C. for 3 hours, the cured copolymer did not exhibit a glass transition ($T_g$) or softening temperature. A TGA thermogram from 75 to 750° C. showed oxidative stability in air to above 300° C. before degradation started to slowly occurred. Between 475 and 600° C. catastrophic decomposition occurred. When the sample that had been cured to 260° C. was postcured at 300° C. for 1 hour, improvements in the oxidative stability was observed.

Example 3

Dow Tactix 742 resin, tri(hydroxyphenyl) methane-based epoxy resin, (0.53 g, 1.14 mmol) and 4,4'-bis(3,4-dicyanophenyl)biphenyl (0.50 g, 1.14 mmol) were weighed into an aluminum planchet, heated to melt at 240–250° C., and degassed at reduced pressure for 1 hour to remove volatiles. A small sample was removed for DSC analysis. A DSC thermogram showed an endotherm peaking at −50° C., an exotherm peaking at −110° C., and an endotherm peaking at −215° C. This latter endotherm is attributed to the melting point of 4,4'-bis(3,4-dicyanophenyl)biphenyl. Almost immediately after the melt of 4,4'-bis(3,4-dicyanophenyl) biphenyl, the sample started to exotherm attributed to reaction of 4,4'-bis(3,4-dicyanophenyl)biphenyl and the Dow Tactix 742 resin to form the copolymer or novel polymeric mixture. After heating of the sample at 250° C. for 3 hours, the resulting polymeric mixture did not exhibit a glass transition as determined by heating the sample at 10° C./min to 275° C.

Example 4

Dow Tactix 742 resin, tri(hydroxyphenyl) methane-based epoxy resin, (0.53 g, 1.14 mmol) and 4,4'-bis(3,4-dicyanophenyl)biphenyl (0.50 g, 1.14 mmol) were weighed into an aluminum planchet, heated to melt at 240–250° C., and degassed at reduced pressure for 1 hour to remove volatiles. At this time 1,3-bis (3-aminophenoxy)benzene (APB, 0.02 g) was added with stirring. After 30 seconds, a sample was removed for DSC analysis. A DSC thermogram showed an endotherm peaking at −60° C., an exotherm peaking at −125° C., and an endotherm peaking at −210° C. Almost immediately after the melting peak, the main sample started to increase in viscosity. The sample was then heated at 260° C. for 3 hours. After 30 minutes at 260° C., the sample had solidified. A TGA thermogram in air of a powdered sample of the cured polymer cured at 260° C. showed thermo-oxidative stability to 300° C. before any weight loss was detected. A small amount of the cured polymer was further heated at 300° C. for 1 hour in air resulting in a slight improvement in the thermo-oxidative stability.

Example 5

Dow epoxy novolac (D.E.N. 431) resin (0.79 g, −2.29 mmol) and 2,2-bis[4-(3,4-dicyanophenoxy)phenyl]propane (1.1 g, 2.29 mmol) were weighed into an aluminum planchet, mixed at 220° C. with stirring, and degassed for 1 hour at reduced pressure. To the melt was added 4,4'-bis (4-aminophenyl)sulfone (0.019 g, 0.076 mmol). After mixing thoroughly, the mixture was cured under a nitrogen atmosphere by heating at 150° C. for 30 minutes, at 225° C. for 2 hours, and at 260° C. for 1 hour. The cured sample showed outstanding thermal and oxidative stability relative to the cured Dow epoxy novolac (D.E.N. 431) resin and a slight improvement in the thermal properties when compared to the corresponding amine cured 2,2-bis[4-(3,4-dicyanophenoxy)phenyl]propane (phthalonitrile) resin (FIG. 1, line A).

Example 6

Dow epoxy novolac (D.E.N. 431) resin (1.10 g, −3.19 mmol) and 2,2-bis[4-(3,4-dicyanophenoxy)phenyl]propane (0.76 g, 1.60 mmol) were mixed with stirring at 220° C. and degassed for 1 hour under reduced pressure. At this time the sample was placed in an over and heated at 220° C. for 6 hours resulting in solidification. The polymeric mixture appeared to be fairly tough.

Example 7

Dow epoxy novolac (D.E.N. 431) resin (1.50 g, −4.35 mmol) and 2,2-bis[4-(3,4-dicyanophenoxy)phenyl]propane (0.42 g, 0.87 mmol) were mixed stirring at 220° C. and degassed for 1 hour under reduced pressure. To the melt was added 4,4'-bis (4-aminophenyl)sulfone (0.019 g, 0.077 mmol). After stirring for 30 seconds, a sample was removed for DSC analysis. A DSC thermogram from 30 to 260° C. did not show an endotherm for the melting point of 2,2-bis [4-(3,4-dicyanophenoxy)phenyl]propane indicating that the resin had been converted from the crystalline phase into the amorphous phase. Upon cooling and rescanning to 260° C., the polymeric mixture did not exhibit a glass transition temperature ($T_g$).

Example 8

Dow epoxy novolac (D.E.N. 431) resin (1.01 g, –2.90 mmol) and a multiple oligomeric aromatic ether-containing phthalonitrile (1.0 g, –0.93 mmol), prepared from reaction of 4,4'-difluorobenzophenone (1 M), 4,4'-(hexafluoroisopropylidene)bisphenol (2 M), 4-nitrophthalonitrile (1 M), and excess potassium carbonate in N-methylpyrrolidinone as solvent yielding a repeat unit of –N=1, were weighed into an aluminum planchet, mixed at 240–250° C., and degassed for 1 hour under reduced pressure. The epoxy-phthalonitrile mixture was cured by heating at 260° C. for 6 hours. During the heat treatment, the mixture solidified into a dark polymer. The polymer appeared to be tough.

Example 9

Shell Epon 828 (0.5 g, –1.47 mmol) and a multiple oligomeric aromatic ether-containing phthalonitrile (1.0 g, –0.87 mmol), prepared from reaction of 4,4'-difluorobenzophenone (2 M), 4,4'-dihydroxybiphenyl (3 M), 4-nitrophthalonitrile (1.5 M), and excess potassium carbonate in N-methylpyrrolidinone as solvent yielding a repeat unit of –N=2, were weighed into an aluminum planchet, mixed at 240–250° C., and degassed for 1 hour under reduced pressure. The epoxy-phthalonitrile mixture was cured by heating at 260° C. for 6 hours. During the heat treatment, the mixture solidified into a dark polymer. The polymer appeared to be tough.

Example 10

Dow epoxy novolac (D.E.N. 431) resin (2.01 g, 5.80 mmol) and 4,4'-bis (4-aminophenyl)sulfone (DADS, 0.30 g, 1.21 mmol) were weighed into an aluminum planchet. The mixture was heated with stirring to 150° C. to dissolve the curing agent (DADS). After the DADS had dissolved, a small sample was removed for thermal analysis studies and the remaining sample was quenched back to room temperature.

Thermal analysis was performed using TGA and DSC. A sample (41.14 mg) of the mixture was placed into in a TGA platinum pan and cured in nitrogen by heating at 150° C. and 225° C. for 1 and 3 hours, respectively. This was the curing procedure recommended by Dow. During the heat treatment, the sample lost about 10% weight. After cooling to room temperature, the cured epoxy novolac resin was heated at 10° C./min in a flow of air (50 cc/min) to 750° C.. The sample was stable to approximately 280° C. whereupon a slow weigh loss commenced. Between 370° C. and 670° C., catastrophic degradation occurred. A DSC thermogram of the mixture shows an exothermic reaction commencing at –150° C. (FIG. 1, line B). After curing at 150° C. and 225° C. for 1 and 3 hours, respectively, the cured sample exhibited a $T_g$ of –160° C. Above 160° C., the sample started to slowly exotherm indicating further reaction.

Example 11

2,2-bis[4-(3,4-dicyanophenoxy)phenyl]propane (1.50 g, 3.15 mmol) was weighed into an aluminum planchet. To the melt at 225° C. was added 4,4'-bis (4-aminophenyl)sulfone (0.06 g, 0.242 mmol) with stirring. After 30 seconds of stirring, a sample of the mixture was removed for thermal analysis studies. A sample (17.446 mg) was weighed-into a platinum TGA pan and cured by heating at 225° C. for 1 hour, at 260° C. for 2 hours, and at 300° C. for 4 hours. During the heat treatment, the sample lost –5.5% weight. Upon cooling the cured sample was scanned at 10° C./min in a flow of air (50 cc/min) to 800° C. (FIG. 1, line C). The polymer commenced to slowly loss weight at –360° C. The sample showed similar oxidative stability relative to the novolac epoxy-phthalonitrile copolymer of Example 5 (FIG. 1, line A).

Obviously, many modifications and variations of the present invention are possible in light of the above teachings. It is therefore to be understood that, within the scope of the appended claims, the invention may be practiced otherwise than as specifically described.

What is claimed is:

1. A copolymer formed by copolymerizing a phthalonitrile resin with an epoxy resin having at least three glycidyl ether groups, in the presence of a primary amine curing agent, said primary amine curing agent being:

a primary amine;

a primary amine salt of an organic acid having an $pK_a$ in water of less than about 1.0; or a primary amine salt of a mineral acid.

2. A copolymer according to claim 1 and being the product of the copolymerization of a phthalonitrile resin having the formula:

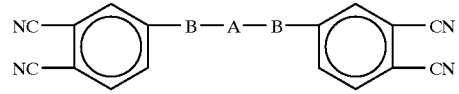

where;

B is oxygen, sulfur or nitrogen, and A is an at least divalent group having at least one aromatic or heterocyclic moiety, with an epoxy resin of the formula;

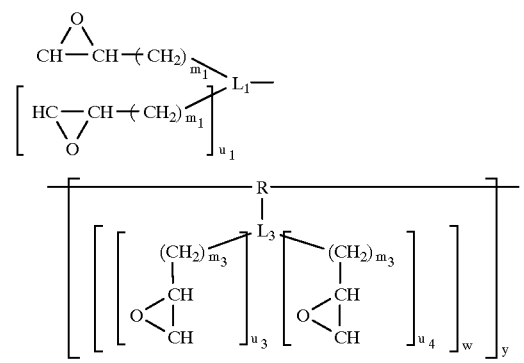

-continued

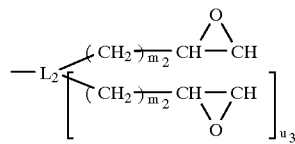

where:

L₁, L₂, and L₃ are oxygen;

m₁, m₂ and m₃ are 1;

u₁, u₂, and u₃ are 0 or 1;

u₄ is 1;

w is an integer and is greater than or equal to one;

at least one of u₁, u₂, and u₃ is equal to 1;

y is at least one; and

R is an at least trivalent organic radical having at least one aromatic or heterocyclic moiety.

3. The copolymer of claim 2, wherein A is selected from the group consisting of:

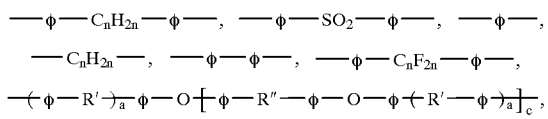

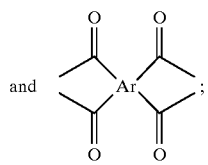

R' is:

-continued

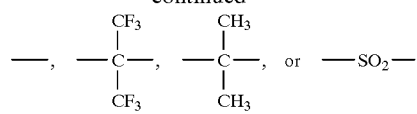

and may be the same or different at each position within A;

R" is:

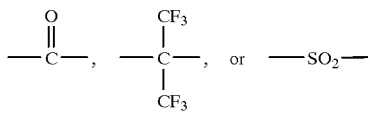

and may be the same or different at each position within A;

Ar is a radical that includes an aromatic or a heterocyclic moiety;

a is 0 or 1;

c is equal to or greater than 1;

B is nitrogen when A is:

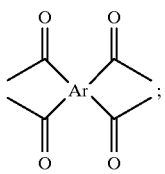

and n is equal to or greater than 1.

4. The copolymer of claim 2, wherein R is selected from the group consisting of:

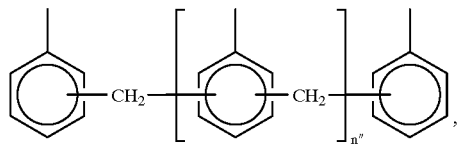

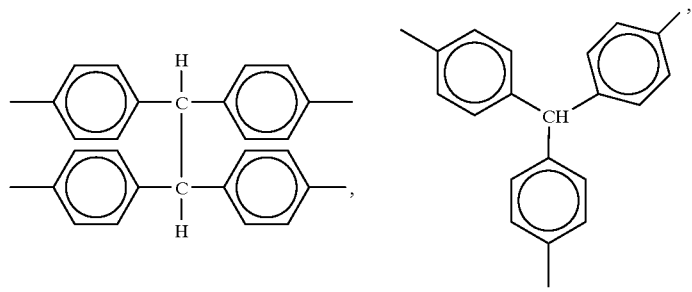

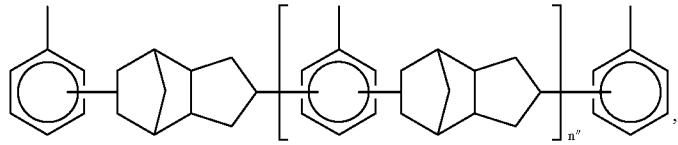

-continued

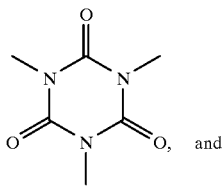

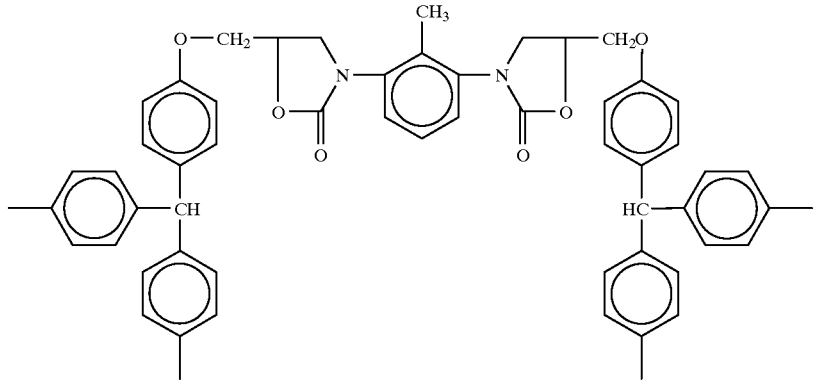

where n' is an integer equal to or greater than 1, and n" is an integer equal to or greater than 1.

5. The copolymer of claim 4, wherein the epoxy resin comprises a mixture of epoxy resins, having said epoxy resin formula, in which R is:

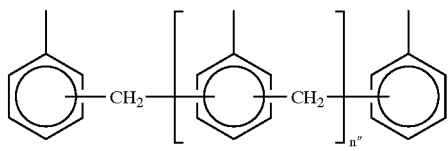

or

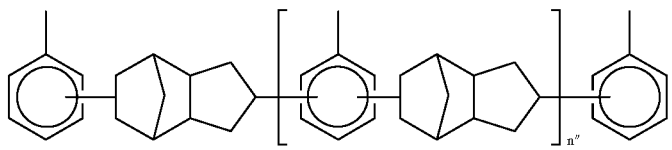

n" having an average value for said mixture of from 0.2 to 3.0, inclusive.

6. A method of making a copolymer, comprising the step of:
mixing together, in a melt, a phthalonitrile resin with an epoxy resin having at least three glycidyl ether groups to form a polymer mixture;
curing said polymer mixture in the presence of a primary amine curing agent, said primary amine curing agent being:
a primary amine
a primary amine salt of an organic acid having a $pK_a$ in water of less than about 1.0; or
a primary amine salt of a mineral acid,
in an amount effective to accelerate said curing of said polymer mixture, thereby forming a copolymer.

7. The method of claim 6, wherein the mole ratio of said epoxy resin to said phthalonitrile resin is from about 1:20 to about 20:1, inclusive.

8. The method of claim 6, wherein said curing agent is present in an amount of about 0.1 to about 40 weight percent of the polymer mixture.

9. The method of claim 6, wherein said curing is performed at a temperature above 150° C. and below the decomposition temperatures of both the phthalonitrile resin and the epoxy resin.

10. The method of claim 6, wherein said phthalonitrile resin has the formula:

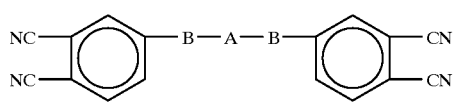

where:

B is oxygen, sulfur or nitrogen, and A is an at least divalent aromatic groups, and said epoxy resin has the formula:

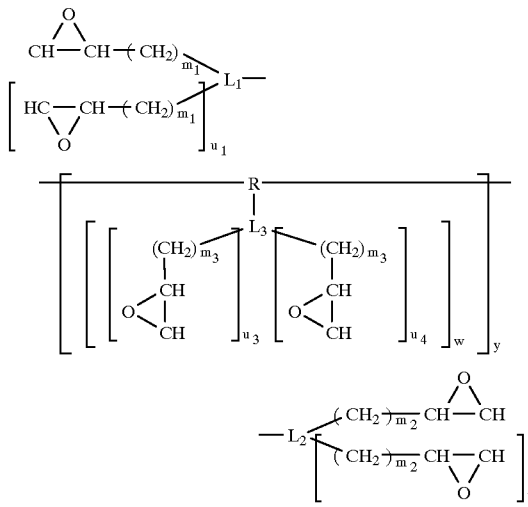

where:

$L_1$, $L_2$ and $L_3$ are oxygen;

$m_1$, $m_2$ and $m_3$ are 1;

$u_1$, $u_2$ and $u_3$ are 0 or 1;

$u_4$ is 1;

w is an integer and is greater than or equal to one;

at least one of $u_1$, $u_2$, and $u_3$ is equal to 1;

y is at least one; and

R is an at least trivalent organic radical having at least one aromatic or heterocyclic moiety.

11. The method of claim 10, wherein A is selected from the group consisting of:

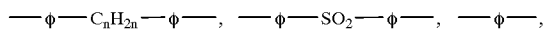
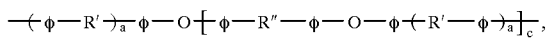

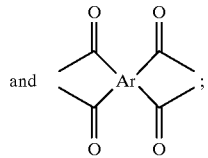

Ar is an aromatic or heterocyclic moiety;

B is oxygen, sulfur or nitrogen, and is nitrogen when A is:

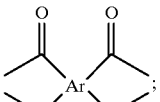

R' is:

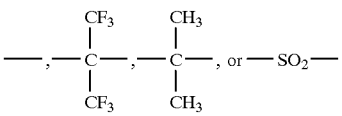

and may be the same or different at each position within A;

R" is:

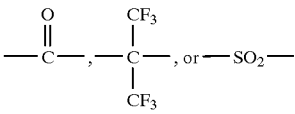

and may be the same or different at each position within A;

a is 0 or 1;

c is equal to or greater than 1; and n is equal to or greater than 1.

12. The method of claim 10, wherein R is selected from the group consisting of:

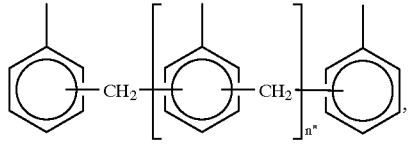

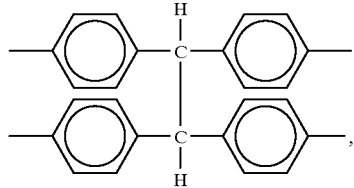

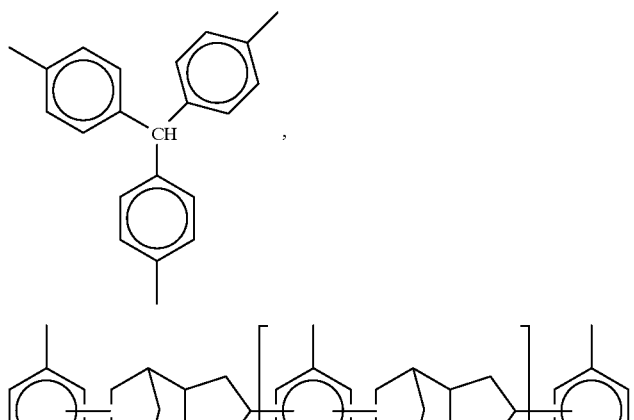

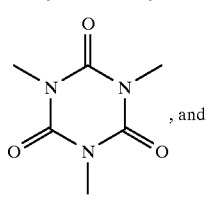, and

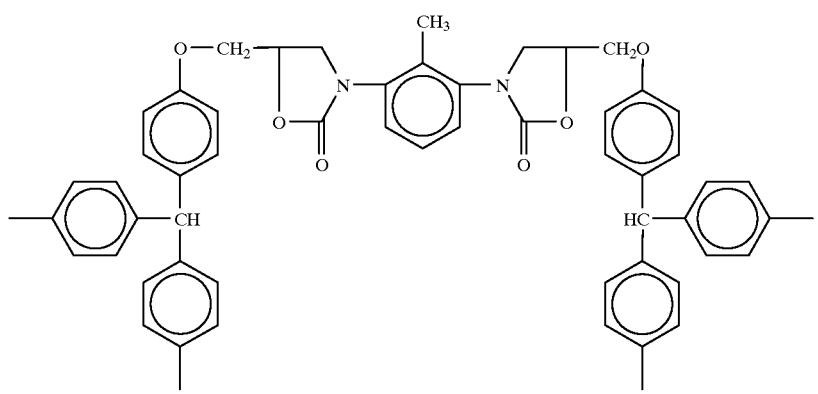

wherein n' is an integer equal to or greater than 1, and n" is an integer equal to or greater than 1.

13. The method of claim 12, wherein the epoxy resin is a mixture of epoxy resins, having said epoxy resin formula, in which R is:

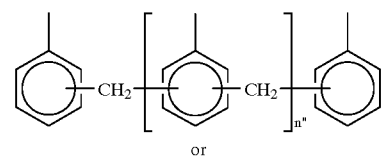

or

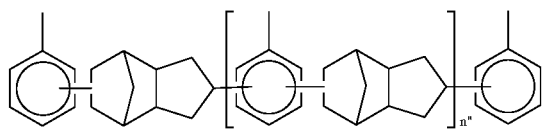

n" having an average value for said mixture of from 0.2 to 3.0, inclusive.

14. The copolymer of claim 1, wherein the mole ratio of said epoxy resin to said phthalonitrile resin is from about 1:20 to about 20:1, inclusive.

15. The copolymer of claim 2, wherein R is:

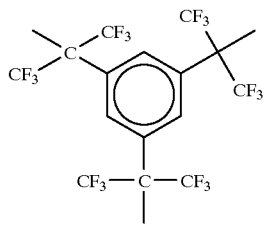

16. The copolymer of claim 2, wherein the mole ratio of said epoxy resin to said phthalonitrile resin is from about 1:20 to about 20:1, inclusive.

17. The method of claim 10, wherein the mole ratio of said epoxy resin to said phthalonitrile resin is from about 1:20 to about 20:1, inclusive.

18. A copolymer formed by the copolymerization of a bisphthalonitrile resin with a bisphenol epoxy resin in the presence of a primary amine curing agent, said primary amine curing agent being:

a primary amine;

a primary amine salt of an organic acid having a pK$_a$ in water of less than about 1.0; or a primary amine salt of a mineral acid, wherein said bisphenol epoxy resin has the formula;

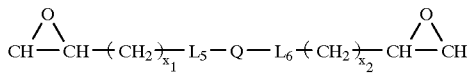

where:

L$_5$ and L$_6$ are oxygen;

x$_1$ is 1;

x$_2$ is 1;

Q is:

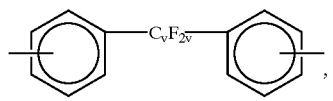

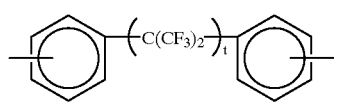

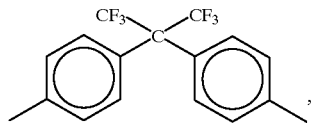

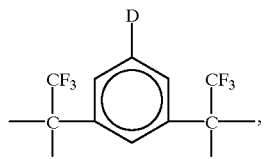

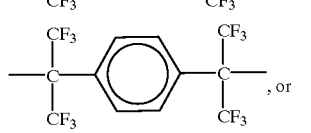

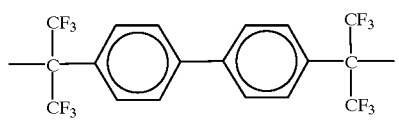

v is an integer having a value of at from 1 to 20, inclusive;

t is an integer having a value of from 1 to 4

D is hydrogen or (CF$_2$)$_j$CF$_3$; and j is an integer having a value of from 0 through 15, inclusive.

19. The copolymer of claim 18, wherein said bisphthalonitrile resin has the formula:

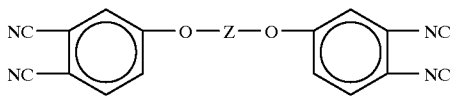

wherein Z is —C$_n$F$_{2n}$— or —C(CF$_3$)$_2$, and n is 1 or more.

20. The copolymer of claim 1, wherein said curing agent is present in an amount of about 0.1 to about 40 weight percent relative to total weight of the epoxy and phthalonitrile resins.

21. The copolymer of claim 20, wherein said curing agent is present in an amount of about 0.1 to about 20 weight percent relative to total weight of the epoxy and phthalonitrile resins.

22. The copolymer of claim 1, wherein said curing agent is an amidine.

23. The copolymer of claim 22, wherein said curing agent is a diamidine.

24. The copolymer of claim 1, wherein said curing agent has the formula, H$_2$NYNH$_2$, where Y is an aromatic group.

25. The method of claim 6, wherein said curing agent is an amidine.

26. The method of claim 25, wherein said curing agent is a diamidine.

27. The method of claim 6, wherein said curing agent has the formula, H$_2$NYNH$_2$, where Y is an aromatic group.

28. The copolymer of claim 18, wherein said curing agent is an amidine.

29. The copolymer of claim 28, wherein said curing agent is a diamidine.

30. The copolymer of claim 18, wherein said curing agent has the formula, H$_2$NYNH$_2$, where Y is an aromatic group.

31. A copolymer formed by the neat copolymerization, in the absence of a curing additive, of a bisphthalonitrile resin with a bisphenol epoxy resin, wherein said bisphenol epoxy resin has the formula:

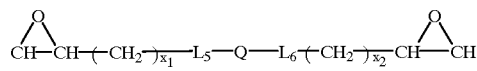

where:

L$_5$ and L$_6$ are oxygen;

x$_1$ is 1;

x$_2$ is 1;

Q is:

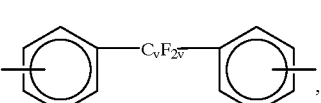

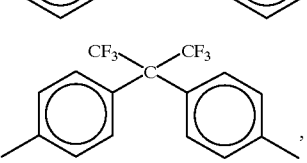

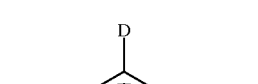

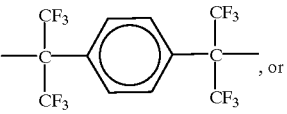

-continued
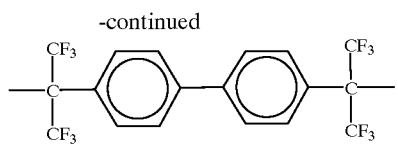
v is an integer having a value of at from 1 to 20, inclusive;
t is an integer having a value of from 1 to 4
D is hydrogen or $(CF_2)_j CF_3$; and
j is an integer having a value of from 0 through 15, inclusive.
* * * * *